United States Patent
Teuchert

(10) Patent No.: US 6,370,329 B1
(45) Date of Patent: Apr. 9, 2002

(54) STABILIZED CAMERA

(75) Inventor: Wolf-Dieter Teuchert, Königsbronn (DE)

(73) Assignee: Zeiss Optronik GmbH, Oberkochen (DE)

(*) Notice: Subject to any disclaimer, the term of this patent is extended or adjusted under 35 U.S.C. 154(b) by 0 days.

(21) Appl. No.: 09/487,870

(22) Filed: Jan. 20, 2000

(30) Foreign Application Priority Data

Jan. 20, 1999 (DE) .......................................... 199 02 081

(51) Int. Cl.[7] .............................................. G03B 39/00
(52) U.S. Cl. ............................... 396/7; 396/13; 359/556
(58) Field of Search ............................... 396/7, 10, 12, 396/13; 359/554, 555, 556

(56) References Cited

U.S. PATENT DOCUMENTS

| | | | | |
|---|---|---|---|---|
| 3,591,250 A | * | 7/1971 | Feinstein et al. | 359/556 |
| 4,246,801 A | * | 1/1981 | Rodgers et al. | 74/5.7 |
| 4,249,791 A | | 2/1981 | Helm et al. | |
| 4,441,808 A | * | 4/1984 | Giacomelli | 355/53 |
| 4,498,038 A | * | 2/1985 | Malueg | 318/648 |
| 5,262,630 A | | 11/1993 | Kordulla | |
| 5,867,317 A | * | 2/1999 | Elie et al. | 359/555 |
| 6,108,133 A | * | 8/2000 | Joffre et al. | 359/556 |
| 6,115,146 A | * | 9/2000 | Suzuki et al. | 358/474 |

FOREIGN PATENT DOCUMENTS

| | | |
|---|---|---|
| DE | 198 26 069 | 12/1998 |
| EP | 0385079 | 9/1990 |
| EP | 0 385 079 | 9/1990 |
| EP | 0302108 | 3/1993 |
| WO | WO 88/05996 | 8/1988 |

* cited by examiner

*Primary Examiner*—David M. Gray
(74) *Attorney, Agent, or Firm*—Walter Ottesen

(57) ABSTRACT

A camera has camera optics and an optics support (3) which is rotatably journalled in a camera housing (5) and includes the camera optics. The camera optics include a first pivot mirror (7) at the input end and a second pivot mirror (11). The first pivot mirror (7) is pivotable about a first pivot axis (9) relative to the optics support (3). The optics support (3) is rotatable relative to the camera housing (5) about a rotational axis (9) parallel to a first pivot axis (9). Furthermore, the second pivot mirror (11) can be pivoted about a second pivot axis (13) running transversely relative to the first pivot axis (9).

18 Claims, 4 Drawing Sheets

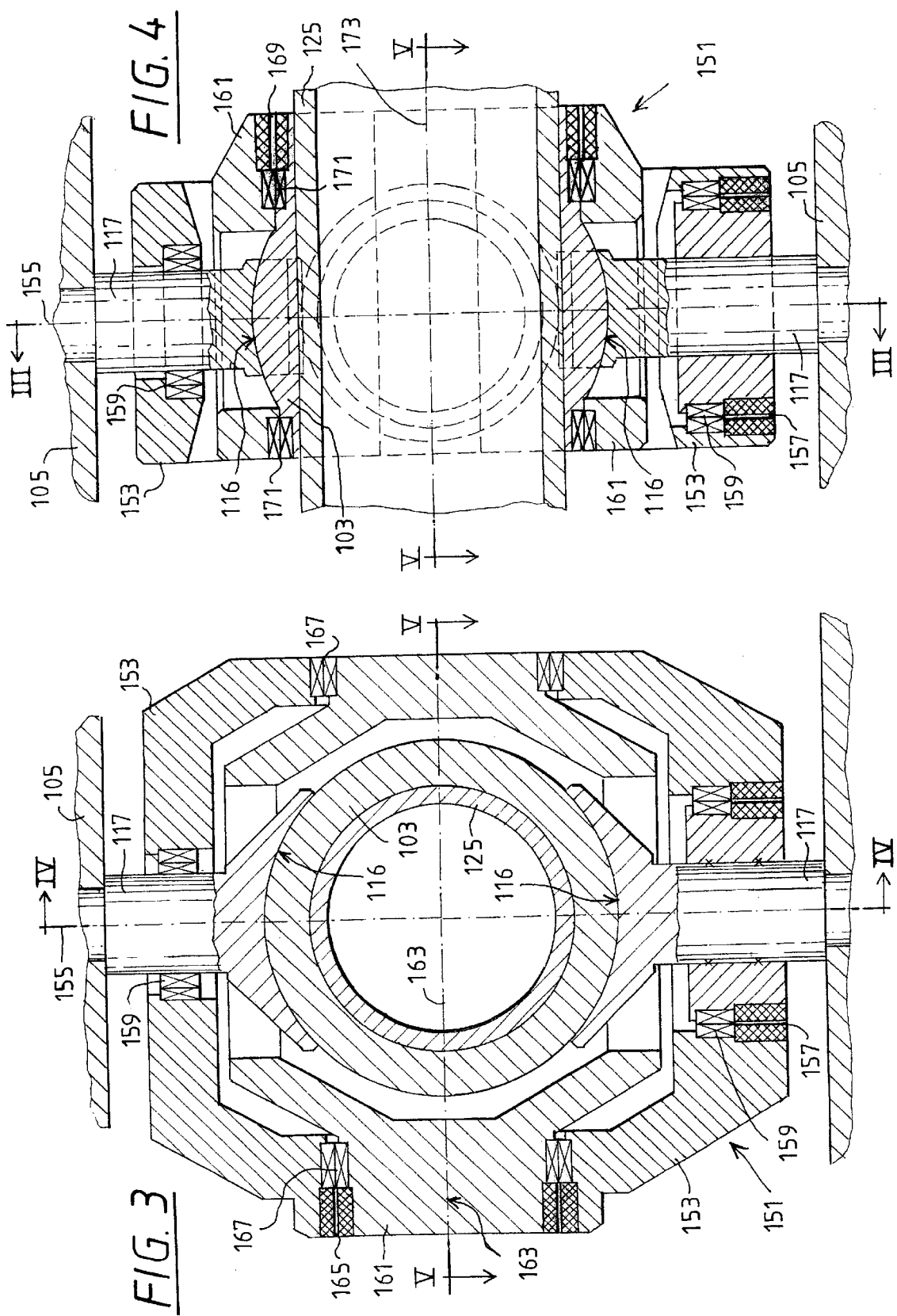

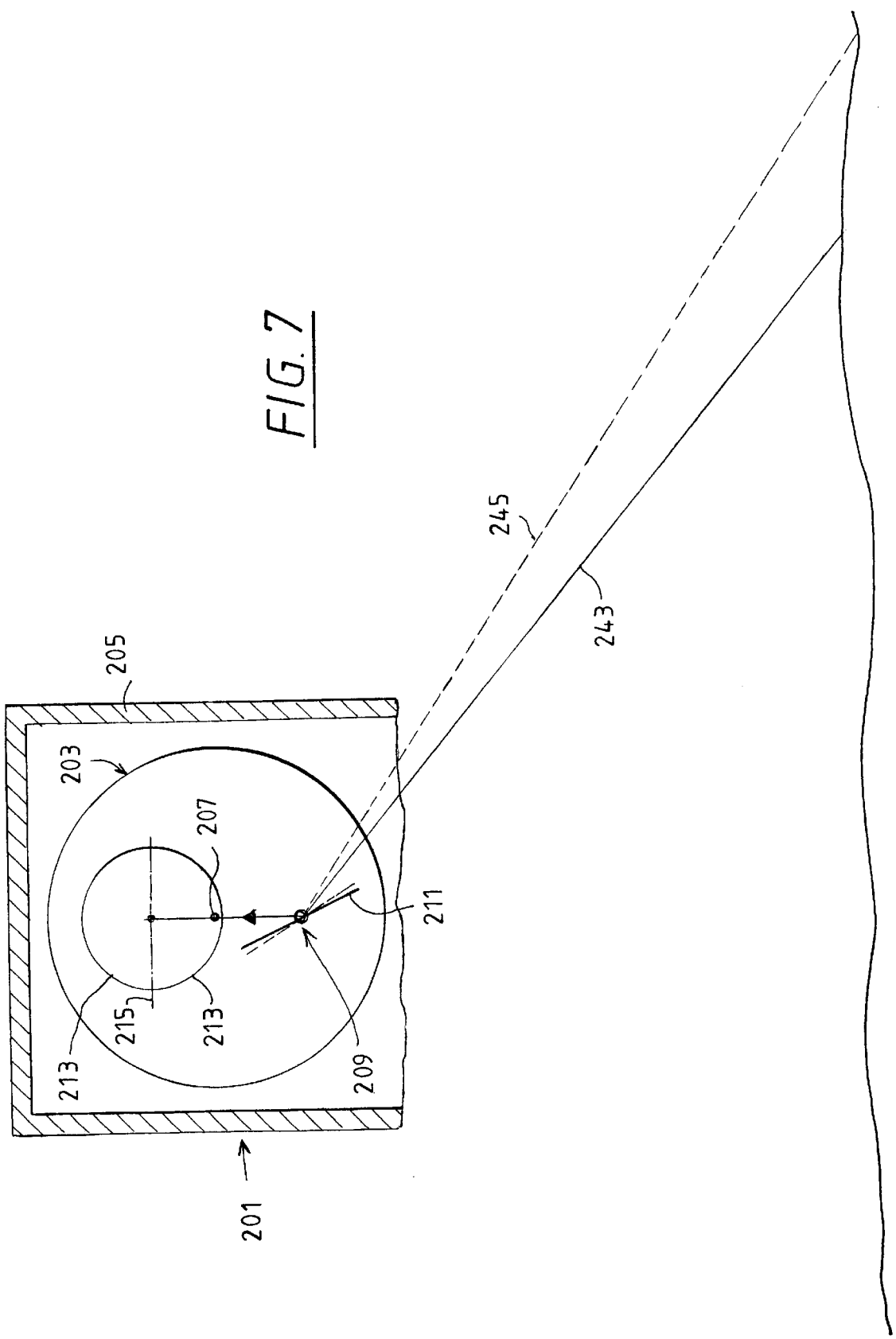

STABILIZED CAMERA

FIELD OF THE INVENTION

The invention relates to a stabilized camera such as an aerial camera or a reconnaissance camera.

BACKGROUND OF THE INVENTION

A camera of the above type is disclosed in European patent publication 0,302,108. In this known camera, the optics support is a stabilized platform on which the camera optic is mounted. This camera optic includes a first pivot mirror and a second pivot mirror.

European patent publication 0,385,079 also discloses a stabilized camera. This camera has a mirror telescope which is intended to be mounted on a track vehicle. The mirror telescope is stabilized about a vertical axis and a horizontal axis.

U.S. Pat. No. 5,262,630, discloses a camera wherein a mirror arrangement can be rotated for scanning the image field. Furthermore, this camera can be adjusted as a unit in different directions.

SUMMARY OF THE INVENTION

It is an object of the invention to provide a camera which has an improved stabilization and/or expanded adjusting possibilities.

The camera of the invention includes: camera optics defining an optical axis and having an input end for admitting a beam; an optics support encompassing the camera optics; the camera optics including: a first pivot mirror mounted at the input end so as to be pivotally movable relative to the optics support about a first pivot axis; and, a second pivot mirror mounted pivotally movable about a second pivot axis extending transversely to the first pivot axis; a housing; and, the optics support being rotatably journalled in the housing so as to be rotatable relative thereto about a rotational axis parallel to the first pivot axis.

BRIEF DESCRIPTION OF THE DRAWINGS

The invention will now be described with reference to the drawings wherein:

FIG. 3 is a transverse section view of another embodiment of the camera of the invention and is taken along line III—III of FIG. 4;

FIG. 4 is a section view of the camera shown in FIG. 3 taken along line IV—IV of FIG. 3;

DESCRIPTION OF THE PREFERRED EMBODIMENTS OF THE INVENTION

Figure 1:
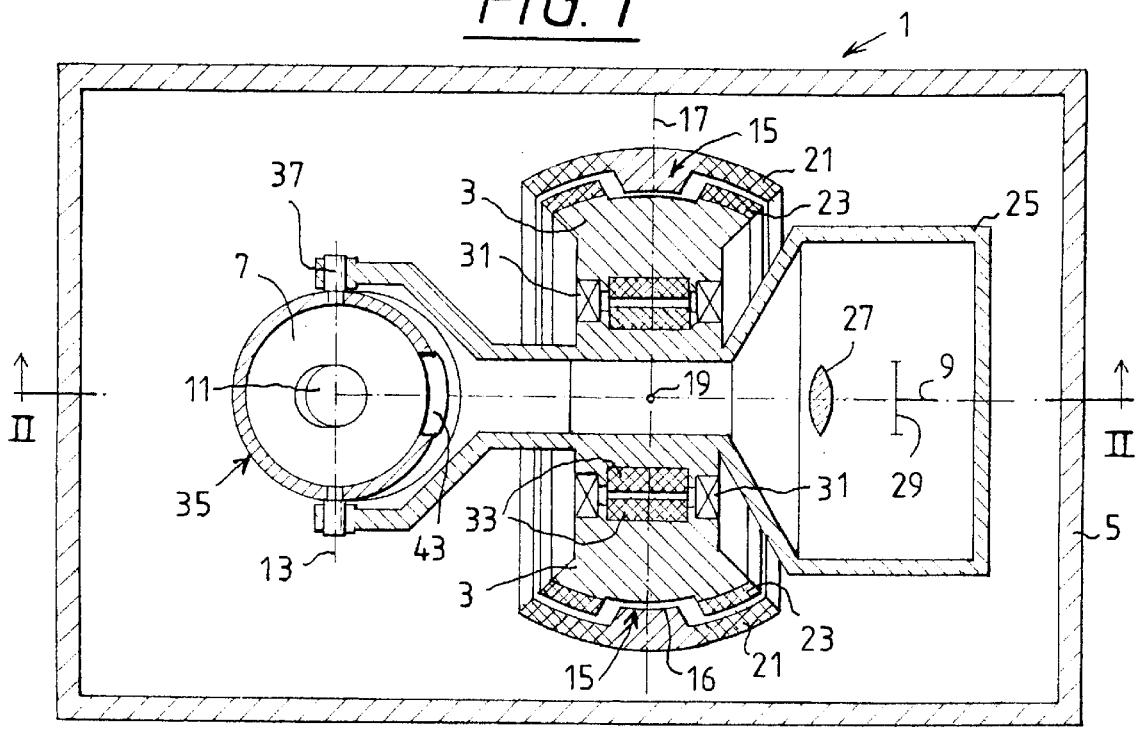
FIG. 1 is a schematic axial longitudinal section view of an embodiment of the camera according to the invention with this view being taken along line I—I of FIG. 2.

In FIG. 1, a camera 1 according to the invention is shown in an axial longitudinal section view. FIG. 1 corresponds to a side view when using the camera 1 in an aircraft, preferably for lateral viewing from the aircraft.

The camera 1 includes an optics support 3 mounted in a camera housing 5. The optics support holds the camera optics, that is, the optical components which are provided for generating and detecting the image.

The camera optics include a pivot mirror 7 which can be pivoted about a first pivot axis 9 relative to the optics support 3. When using the camera 1 in an aircraft, the first pivot axis 9 is essentially parallel to the roll axis of the aircraft or corresponds thereto.

In FIG. 1, a second pivot mirror 11 is mounted forward of the first pivot mirror 7. The first pivot mirror 7 and the second pivot mirror 11 can be pivoted about a second pivot axis 13 orthogonal to the first pivot axis 9.

The optics support 3 is itself journalled by a ball joint 15 in the camera housing 5 and therefore can be rotated in all directions relative to the camera housing 5. The ball joint 15 especially ensures a rotatability of the optics support 3 about the first pivot axis 9 and about an axis 17 which is orthogonal to the first pivot axis 9. The journalling of the optics support 3 in the ball joint 15 furthermore makes possible a rotation of the optics support 3 about axes which are essentially parallel to the roll axis, pitch axis, and yaw axis of the carrier of the camera, for example, an aircraft. These axes can also be essentially coincident with the roll, pitch and yaw axes of the carrier.

Spherical torque motors include stator windings 21 fixed to the camera housing 5 and motor magnets 23 fixed to the optics support 3. With these torque motors, the optics support 3 can be adjusted in the ball joint 15 in the context of its movement range or pivot range which is limited by its structural configuration.

The ball joint 15 includes an air bearing 16 so that a very low friction journalling of the optics support 3 is achieved. In this way, a highly effective stabilization of the optics support 3 relative to movement fluctuations of the camera carrier is possible.

An inner frame 25 is journalled in the optics support 3 in such a manner that it is rotatable relative to the optics support 3 about the first pivot axis 9. All optically effective components of the camera 1 are accommodated in the inner frame 25. Of these components, an ocular optic 27, which is shown schematically as a lens, and an image sensor 29 are indicated in FIG. 1 in addition to the first pivot mirror 7 and the second pivot mirror 11. The image sensor 29 is preferably an electrooptic sensor such as a CCD area array. The camera 1 can also include an image sensor for visible light and a further image sensor for infrared light.

The inner frame 25 has a dumbbell shape and is rotatably journalled in the optics support 3 about the first pivot axis 9 in a central section thereof via a rotational bearing 31. The inner frame 25 can be rotated about the first pivot axis 9 by means of a drive assembly 33.

A mirror objective 35 is mounted on a rotary joint 37 in the forward dumbbell region at the camera input end in such a manner that the mirror objective 35 can be pivoted about the second pivot axis 13. The rotary joint 37 includes a drive assembly (not shown). The image sensor optics 27 and the image sensor 29 are mounted in the rearward region of the dumbbell-shaped inner frame 25. With respect to the stabilization of the camera 1, the center of gravity of the inner frame 25 is preferably in its central section.

Figure 2:
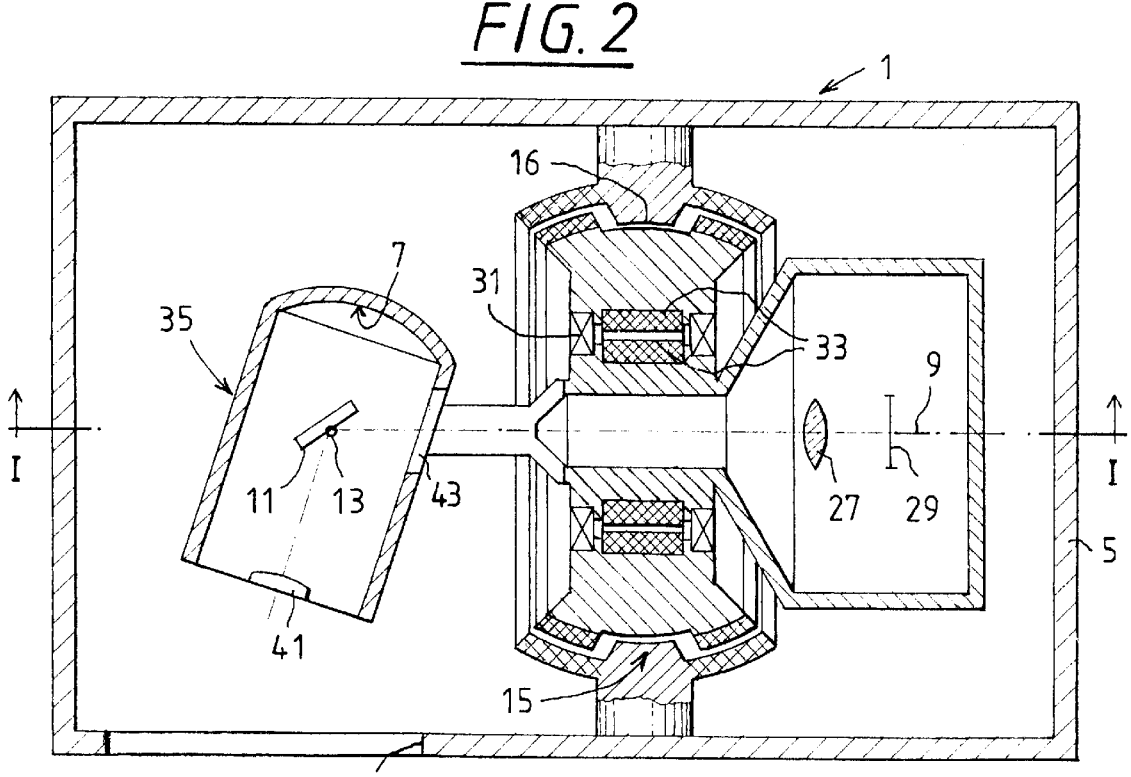
FIG. 2 is a section view of the embodiment of FIG. 1 taken along line II—II of FIG. 1.

FIG. 2 shows the camera 1 in a further axial longitudinal section view and corresponds to a plan view for the preferred application of the camera 1 for a lateral view from an aircraft.

In FIG. 2, the mirror objective 35 corresponds to the Cassegrain type. The first pivot mirror 7 here serves as the main mirror of the mirror objective 35. The pivot mirror 7 deflects the radiation, which enters through the window 39 in the camera housing 5, to the secondary mirror 41. From the secondary mirror 41, the beam path is then directed to the second pivot mirror 11 and from the latter through a side opening 43 in the mirror objective 35 to the image sensor optics 27. The second pivot mirror 11 is configured as a planar deflection mirror.

The second pivot mirror 11 is mounted between the first pivot mirror 7 and secondary mirror 41. For a pivoting of the mirror objective 35 about the second pivot axis 13, the second pivot mirror 11 is rotated about the second pivot axis 13 in such a manner that the beam path between the second pivot mirror 11 and the image sensor optics 27 remains unchanged. For this purpose, and for a pivoting of the mirror objective 35 about an angle α, the second pivot mirror 11 must be rotated by an angle α/2, that is, at half the angular velocity of the first pivot mirror 7.

With this configuration, the camera 1 according to the invention makes a two-stage stabilization possible. The air journalled optic support 3 defines a first stabilization stage with respect to roll, pitch and yaw movements of the camera carrier and the inner frame 25 with the rotational joints 31 and 37 defines a second stabilization stage. Alternatively, the rotational joints 31 and 37 of the inner frame 25 can also serve for directionally adjusting the camera 1 to the object to be detected. The rotational joint 37 is, in addition, especially suited for compensating the influence of the stable flying movements of the camera carrier on the image field of the camera 1, that is, for so-called forward motion compensation (FMC). In this way, the mirror objective 35 permits angular movements of the line of sight in the direction of flight by approximately ±30°. The mirror objective 35 is rotatably mounted about the second pivot axis 13 in the inner frame 25.

Figure 5:
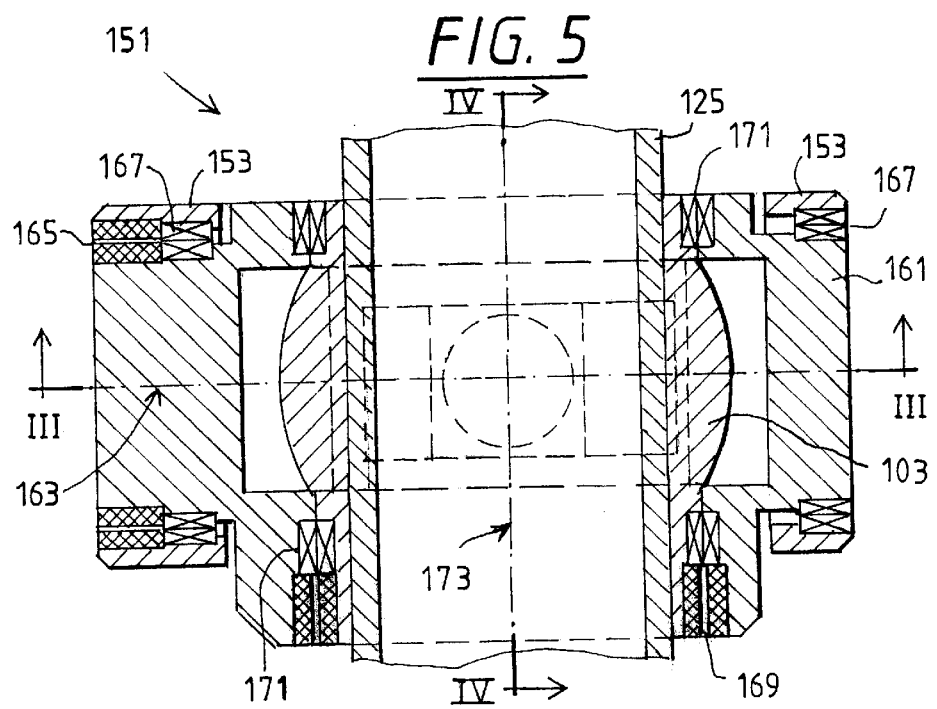
FIG. 5 is a view of the camera of FIG. 3 taken in the direction of arrows V of FIG. 3.

In FIGS. 3, 4 and 5, a camera 101 according to the invention is shown in a section front view, side view and plan view, respectively. The camera 101 differs from the camera 1 only with respect to its advantageous manner of journalling and moving the optics support. For this reason, only the bearing and drive assembly groups of the camera 101 are shown.

The elements of camera 101 which correspond to elements in FIGS. 1 and 2 have the same reference numerals increased by 100. For these elements, reference may be made to the description with respect to FIGS. 1 and 2.

FIG. 3 shows a cross section viewed in flight direction taken through the bearing and drive assembly groups of the camera 101 and shows that optics support 103 is held in the camera housing 105 by a spherical air bearing 116 and can be adjusted or pivoted via a cardanic frame 151 relative to the camera housing 105. The cardanic frame 151 is mounted around the spherical air bearing 116. For this purpose, the cardanic frame 151 is equipped with motors and position transducers which can adjust or move the optics support 103 about three axes directionally toward the target.

FIG. 3 shows that the two spherical bearing shells of the air bearing 116 are connected fixedly via column supports 117 to the camera housing 105. The cardanic frame 151 includes a yaw frame 153 which can rotate about a yaw axis 155. For this purpose, motor/resolver combinations 157 are provided in FIGS. 3 to 5 for rotational drive and angular measurements and rotational bearings 159. The rotational bearings 159 are mounted between the column supports 117 and the yaw frame 153 and are, on the one hand, supported by the column supports 117 and, on the other hand, by the yaw frame 153. The motor/resolver combinations are shown cross hatched in FIGS. 3 to 5.

A pitch frame 161 is mounted in the yaw frame 153 and is rotatable relative to the yaw frame 153 about a pitch axis 163. The rotation about the pitch axis 163 is made possible by the motor/resolver combinations 165 and the rotational bearing 167. The rotational bearing 167 is mounted between the yaw frame 153 and the pitch frame 161.

In FIGS. 4 and 5, motor/resolver combinations 169 and rotational bearings 171 are mounted between the pitch frame 161 and the optics support 103. The optics support 103 can be rotated about a roll axis 173 via the motor/resolver combinations 169 and rotational bearings 171.

The rotational drive, which is shown schematically in FIGS. 1 and 2, is between the optics support and the inner frame and is not shown in FIGS. 3 to 5 for the sake of clarity. It is understood that the camera 101 can, however, also be configured without an inner frame 125 rotatable relative to the optics support 103.

Cross couplings of the force components can result with the movement of the optics support 3 of the camera 1 by means of the spherical torque motors (21, 23) and these cross couplings can operate unfavorably on the camera stabilization. However, this is precluded with the motors supported by the cardanic frame 151 of the camera 101.

In addition, in the camera 101, the air bearing 116 carries the entire static load of the optics support 103. The bearing and the motors of the cardanic frame 151 need therefore only be designed with respect to the inertia occurring with movements of the optics support 103, that is, the bearing and motors only need be designed with respect to dynamic loads. Accordingly, conventional roller bearings or magnetic bearings requiring only low current intensities can be used for the bearings of the cardanic frame 151. The current supply of the camera 101 can be low and heating problems and/or EMV problems caused by eddy currents are substantially precluded.

Figure 6:
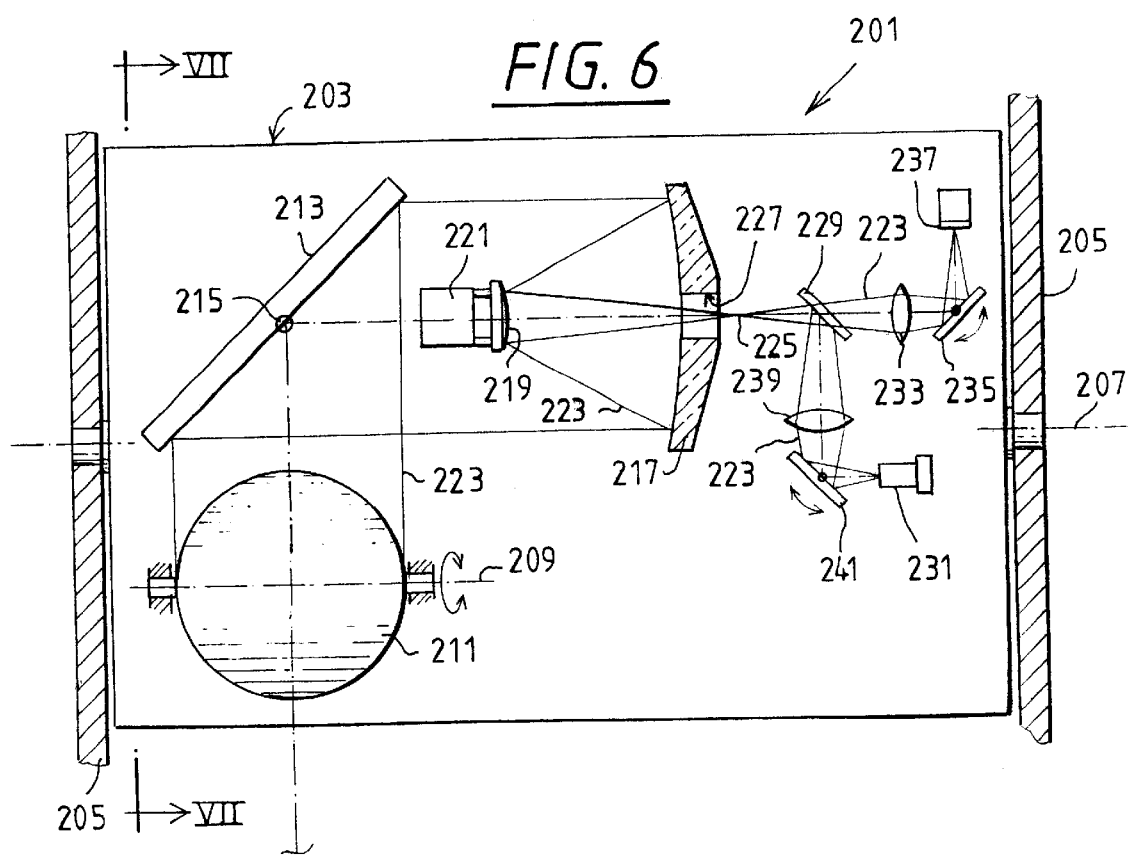
FIG. 6 is a side elevation view of a third embodiment of the camera according to the invention; and, FIG. 7 is a detail view of a portion of the camera of FIG. 6 as seen in the direction of arrows VII of FIG. 6.

FIG. 6 shows another camera according to the invention in axial longitudinal section which is identified by reference numeral 201. The camera 201 includes an optics support 203 which is rotatably journalled in a camera housing 20S about a rotational axis 207.

The camera optics of the camera 201 include, at the input end, a pivot mirror 211 which can be pivoted about a first pivot axis 209. For camera 201, the first pivot axis 209 is arranged parallel and at a spacing from the rotational axis 207. The first pivot axis 209 can, however, also be coincident with the rotational axis 207.

A second pivot mirror 213 is mounted downstream of the first pivot mirror 211. The second pivot mirror 213 is pivotable about a second pivot axis 215 orthogonal to the plane of the drawing of FIG. 6.

When using the camera 201 in an aircraft, the rotational axis 207 and the first pivot axis 209 are preferably arranged in flight direction whereby the first pivot mirror 211 makes possible a movement of the image field laterally to the direction of flight. In an application of this kind, the second pivot mirror 213 is suitable for the movement of the image field in flight direction or for movement compensation (FMC). The second pivot mirror 213 can, however, also be used for stabilizing the camera 201 relative to pitch movements of the aircraft carrying the camera 201 or as a directional mirror for detecting selected object regions.

A mirror objective having a primary mirror 217 and a secondary mirror 219 is mounted downstream of the second pivot mirror 213. The secondary mirror 219 is adjustable about two axes via a adjusting unit 221. In this way, a fine stabilization of the camera 201 can be carried out with the secondary mirror.

In FIG. 6, the trace of the beam in the camera optics is shown schematically by the lines 223. The first pivot mirror 211 and the second pivot mirror 213 are planar mirrors as shown. The planar mirrors direct the beam 223, which incidents in the camera 201, onto the primary mirror 217 configured as a parabolic mirror. The primary mirror 217 directs the beam 223 to the secondary mirror 219. The secondary mirror 219 is configured to be convex hyperbolic and has a first focal point which is coincident with the focal point of the primary mirror 217. A second focal point 225 of the secondary mirror 219 lies in the vicinity of the central bore 227 of the primary mirror 217.

A beam splitter 229 is mounted downstream of the second focal point 225. The beam splitter 229 is transmissive for the visible wavelength range of the incident beam 223 and deflects the infrared wavelength range of the incident beam 223 to an IR image sensor 231. The visible component of the beam 223 is directed to an electrooptic image sensor 237 via a schematically shown ocular optic 233 and a pivotable deflecting mirror 235. Likewise, a schematically shown ocular optic 239 and a pivotable deflecting mirror 241 are arranged between the beam splitter 229 and the IR image sensor 231.

The deflecting mirrors 235 and 241 are controllable with respect to their pivot position and can be used for the following: sequentially scanning the field of view (that is, for sequentially imaging onto the corresponding image sensors); for compensating for the movement of the camera support; or for compensating the pivot movement of the first and/or second pivot mirrors (211, 213).

The image sensors (231, 237) can be line detectors but are preferably configured as areal detectors.

The arrangement of the deflecting mirror 235 and image sensor 237 or deflecting mirror 241 and image sensor 231 can be so arranged with respect to the position of the deflecting mirror pivot axes that they compensate for the lateral viewing field pivoting of the first pivot mirror 211 and/or the flight direction or pivot movement of the second deflecting mirror 213.

In FIG. 7, the camera 201 is shown as an aerial camera in the direction of flight of a camera support not shown.

The viewing direction can be changed transversely to the direction of flight by pivoting the first pivot mirror 211 about the first pivot axis 209. In the solid line position of the first pivot mirror 211, the direction of view and the field of view corresponding to this direction is shown by a solid sight line 243 and by a broken sight line 245 in the position of the first pivot mirror 211 shown by the broken line.

The sight line 243 or 245 is deflected by the first pivot mirror 211 to the second pivot mirror 213 which is pivotable about the second pivot axis 215.

The stabilization of the camera 201 with respect to fluctuations of the movement of the camera support can be carried out in the manner described below.

A stabilization about the roll axis of an aircraft, which carries the camera 201, can be achieved by the rotatability of the optics support 203 about the longitudinal axis 207. The first pivot mirror 211 need not be utilized for stabilization when the first pivot mirror 211 is used for changing the field of view laterally with respect to the direction of flight. However, it is understood that a two-stage roll stabilization can use the first pivot mirror 211 as a second stabilization stage.

The second pivot mirror 213 can be used for stabilizing the pitch movements of the camera support with the aid of a gyro driven via a 2:1 belt transmission in a manner known per se. A fine stabilization can be achieved via the secondary mirror 219.

During the illuminating time of the image sensors, the finite illumination time of the image sensors can require a compensation of the movement of the field of view caused by the flight velocity or pivot movements of the pivot mirrors.

When recording larger areal regions at a small ratio of flight velocity to flight elevation, image strips of approximately 10° width are detected with rapid lateral pivoting of the first pivot mirror 211. The image movement is compensated by corresponding pivot movements of the deflecting mirrors 235 and 241. After the recording of image strips, the pivot mirror 211 is rapidly pivoted back into its start position. The second pivot mirror 213 serves for pitch stabilization and for joining the component images in flight direction.

During the recordation of stereo images or images sequences, the second pivot mirror 213 assumes the compensation of the flight movement so that the same topography is covered on the ground.

If it is no longer possible to record the entire topography flown over in the manner described when there is a larger ratio of flight speed to flight elevation (that is, especially for higher flight speeds), the image strip width can, on the one hand, be reduced or, on the other hand, the second pivot mirror 213 can be utilized for movement compensation. In the extreme case of very high velocities, a lateral pivot with the first pivot mirror 211 can be omitted.

It is understood that the foregoing description is that of the preferred embodiments of the invention and that various changes and modifications may be made thereto without departing from the spirit and scope of the invention as defined in the appended claims.

What is claimed is:

1. A camera comprising:

camera optics defining an optical axis and having an input end for admitting a beam;

an optics support encompassing said camera optics;

said camera optics including: a first pivot mirror mounted at said input end so as to be pivotally movable relative to said optics support about a first pivot axis; a second pivot mirror mounted pivotally movable about a second pivot axis extending transversely to said first pivot axis; and, an image sensor arranged on said optical axis downstream of said first and second pivot mirrors;

a housing; and, said optics support being rotatably journalled in said housing so as to be rotatable relative thereto about a rotational axis parallel to said first pivot axis.

2. The camera of claim 1, said optics support including: a supporting structure; an inner frame for supporting said camera optics; and, a bearing assembly disposed between said supporting structure and said inner frame for rotatably journalling said inner frame to rotate relative to said supporting structure about said first pivot axis; and, said first pivot mirror being pivotally movable relative to said inner frame.

3. The camera of claim 2, said camera optics including an image sensor optics upstream of said image sensor and a mirror objective of the Cassegrain type and said mirror objective including said first pivot mirror as a primary mirror; a secondary mirror and said second pivot mirror; and, said second pivot mirror being a planar deflecting mirror for deflecting said beam along a beam path to said image sensor optics.

4. The camera of claim 1, wherein said first pivot mirror pivots about said first pivot axis at a first angular velocity and said second pivot mirror pivots about said second pivot axis at a second angular velocity half of said first angular velocity.

5. The camera of claim 2, said bearing assembly including a ball joint for journalling said optics support in said housing.

6. The camera of claim 5, wherein said ball joint is a spherical air bearing.

7. The camera of claim 5, further comprising a spherical torque motor mounted between said housing and said optics support for rotating said optics support.

8. The camera of claim 7, wherein said spherical torque motors are magnetic motors having stator windings fixedly mounted in said housing and rotor magnets fixedly mounted on said optics support.

9. The camera of claim 5, said supporting structure and said bearing assembly conjointly defining a three-axes cardanic assembly having a cardanic frame arranged around said ball joint; and, said inner frame being rotatable relative to said housing by said cardanic assembly.

10. The camera of claim 1, wherein said camera optics includes an image sensor; and, an image sensor optic having a pivotal deflecting mirror and being assigned to said image sensor.

11. The camera of claim 1, wherein said camera optics includes electrooptical image sensors.

12. The camera of claim 1, wherein said camera optics includes an image sensor for visible light and an image sensor for infrared light.

13. The camera of claim 12, further comprising a first image sensor optic having a pivot mirror and being assigned to said image sensor for visible light; and, a second image sensor optic having a pivot mirror and being assigned to said image sensor for infrared light.

14. A camera comprising:

camera optics defining an optical axis and having an input end for admitting a beam;

an optics support encompassing said camera optics;

said camera optics including: a first pivot mirror mounted at said input end so as to be pivotally movable relative to said optics support about a first pivot axis; and, a second pivot mirror mounted pivotally movable about a second pivot axis extending transversely to said first pivot axis;

a housing;

said optics support being rotatably journalled in said housing so as to be rotatable relative thereto about a rotational axis parallel to said first pivot axis;

said optics support including: a supporting structure; an inner frame for supporting said camera optics; a bearing assembly disposed between said supporting structure and said inner frame for rotatably journalling said inner frame to rotate relative to said supporting structure about said first pivot axis; and, said first pivot mirror being pivotally movable relative to said inner frame;

said bearing assembly including a ball joint for journalling said optics support in said housing;

said supporting structure and said bearing assembly conjointly defining a three-axes cardanic assembly having a cardanic frame arranged around said ball joint;

said inner frame being rotatable relative to said housing by said cardanic assembly; and, said inner frame having a dumbbell configuration having a mid region journalled in said bearing assembly.

15. The camera of claim 14, wherein said first pivot axis defines the longitudinal axis of the dumbbell-shaped inner frame.

16. A camera comprising:

camera optics defining an optical axis and having an input end for admitting a beam;

an optics support encompassing said camera optics;

said camera optics including: a first pivot mirror mounted at said input end so as to be pivotally movable relative to said optics support about a first pivot axis; and, a second pivot mirror mounted pivotally movable about a second pivot axis extending transversely to said first pivot axis;

a housing;

said optics support being rotatably journalled in said housing so as to be rotatable relative thereto about a rotational axis parallel to said first pivot axis;

a mirror objective having a primary mirror and a secondary mirror adjustable about two axes; and, said mirror objective being arranged downstream of said first pivot mirror and said second pivot mirror.

17. A camera comprising:

camera optics defining an optical axis and having an input end for admitting a beam;

an optics support encompassing said camera optics;

said camera optics including: a first pivot mirror mounted at said input end so as to be pivotally movable relative to said optics support about a first pivot axis; and, a second pivot mirror mounted pivotally movable about a second pivot axis extending transversely to said first pivot axis;

a housing;

said optics support being rotatably journalled in said housing so as to be rotatable relative thereto about a rotational axis parallel to said first pivot axis;

said optics support including: a supporting structure; an inner frame for supporting said camera optics; a bearing assembly disposed between said supporting structure and said inner frame for rotatably journalling said inner frame to rotate relative to said supporting structure about said first pivot axis; and, said first pivot mirror being pivotally movable relative to said inner frame; and, said inner frame having a dumbbell configuration having a mid region journalled in said bearing assembly.

18. The camera of claim 17, wherein said first pivot axis defines the longitudinal axis of the dumbbell-shaped inner frame.

* * * * *